(12) United States Patent
Uedahira et al.

(10) Patent No.: US 6,705,077 B2
(45) Date of Patent: Mar. 16, 2004

(54) EXHAUST GAS RECIRCULATION CONTROL SYSTEM AND METHOD AND ENGINE CONTROL UNIT FOR INTERNAL COMBUSTION ENGINE

(75) Inventors: Hideki Uedahira, Saitama-ken (JP); Toru Kitamura, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/118,067

(22) Filed: Apr. 9, 2002

(65) Prior Publication Data

US 2002/0144501 A1 Oct. 10, 2002

(30) Foreign Application Priority Data

Apr. 9, 2001 (JP) ........................................ 2001-110013

(51) Int. Cl.[7] .............................................. F02M 25/06
(52) U.S. Cl. ........................................... 60/278; 60/274
(58) Field of Search .......................... 60/274, 276, 278, 60/285, 286

(56) References Cited

U.S. PATENT DOCUMENTS

| | | | | | |
|---|---|---|---|---|---|
| 5,564,283 A | * | 10/1996 | Yano et al. | .................... | 60/278 |
| 5,595,060 A | * | 1/1997 | Togai et al. | .................. | 60/274 |
| 5,826,427 A | * | 10/1998 | Yanagihara et al. | .......... | 60/274 |
| 5,884,476 A | * | 3/1999 | Hirota et al. | .................. | 60/278 |
| 6,003,306 A | * | 12/1999 | Kalversberg et al. | ......... | 60/278 |
| 6,109,025 A | * | 8/2000 | Murata et al. | ................. | 60/278 |
| 6,269,634 B1 | * | 8/2001 | Yokota et al. | ................. | 60/286 |
| 6,422,003 B1 | * | 7/2002 | Ament et al. | .................. | 60/278 |

* cited by examiner

*Primary Examiner*—Thomas Denion
*Assistant Examiner*—Tu M. Nguyen
(74) *Attorney, Agent, or Firm*—Arent Fox Kintner Plotkin & Kahn

(57) ABSTRACT

There is provided an exhaust gas recirculation control system and method and an engine control unit for an internal combustion engine, which is capable of properly controlling an exhaust gas recirculation rate in advance according to the NOx-eliminating performance of a catalyst, thereby reducing exhaust emissions. An internal combustion engine eliminates NOx in exhaust gases by a catalytic converter, and recirculates the exhaust gases into an intake pipe. An exhaust gas recirculation control system for the engine includes an ECU. The ECU calculates a NOx exhaust estimate based on the intake pipe absolute pressure and the engine rotational speed detected by the respective sensors, calculates an estimated NOx elimination ratio of the catalytic converter based on an estimated catalyst temperature and the space velocity through the catalytic converter. The ECU calculates an uneliminated NOx estimate based on the NOx exhaust estimate and the estimated NOx elimination ratio, and calculates a target valve lift amount of an EGR control valve based on the uneliminated NOx estimate.

20 Claims, 7 Drawing Sheets

EXHAUST GAS RECIRCULATION CONTROL SYSTEM AND METHOD AND ENGINE CONTROL UNIT FOR INTERNAL COMBUSTION ENGINE

BACKGROUND OF THE INVENTION

1. Field of the Invention

This invention relates to an exhaust gas recirculation control system and method and an engine control unit for an internal combustion engine, for controlling an exhaust gas recirculation (EGR) rate so as to reduce NOx emission.

2. Description of the Prior Art

Conventionally, an exhaust gas recirculation control system of the above kind was disclosed e.g. in Japanese Patent Registration No. 2503387. The exhaust gas recirculation (hereinafter referred to as "EGR") control system includes an EGR control valve arranged in an EGR passage, for controlling an EGR rate, a NOx sensor arranged in an exhaust passage at a location downstream of a catalyst, for detecting the concentration of NOx in exhaust gases, an air flow meter for detecting the amount of intake air, and a vehicle speed sensor which outputs a pulse signal in synchronism with rotation of a propeller shaft.

In the EGR control system, the total amount of NOx in exhaust gases emitted per unit travel distance (1 km) of the vehicle is calculated based on signals delivered from the NOx sensor, the air flow meter and the vehicle speed sensor, and a ratio of the total amount of NOx emitted thus calculated to a target value is compared with a predetermined value. If the ratio is larger than the predetermined value, i.e. if the calculated total amount of NOx is larger than an allowable limit, the degree of opening of the EGR control valve is increased by a predetermined amount, or in other words, the EGR rate is increased. As a result, the combustion temperature of an air-fuel mixture within the combustion chamber is lowered, whereby the amount of NOx in exhaust gases is reduced. On the other hand, if the above ratio is smaller than the predetermined value, i.e. if the calculated total amount of NOx is smaller than the allowable limit, it is judged that the NOx-eliminating performance of the catalyst is well within the limit thereof, and hence the degree of opening of the EGR control valve is decreased by a predetermined amount so as to secure an increased output of the engine, whereby the EGR rate is decreased.

However, the above conventional EGR control system for an internal combustion engine only calculates the EGR rate for the next control cycle by using the parameter of the total amount of NOx in exhaust gases emitted per unit travel distance, i.e. the total amount of NOx which has already been actually emitted via the catalyst. For this reason, when the NOx-eliminating performance of the catalyst is low in the present control cycle, and NOx is exhausted from the engine at a flow rate far beyond the NOx-eliminating of the catalyst, a large amount of NOx which cannot be treated by the catalyst is emitted into the atmosphere, so that the engine is left in a state of high exhaust emissions until the EGR rate is updated in the next control cycle.

SUMMARY OF THE INVENTION

It is an object of the invention to provide an exhaust gas recirculation control system and method and an engine control unit for an internal combustion engine, which is capable of properly controlling an exhaust gas recirculation rate in advance according to the NOx-eliminating performance of a catalyst, thereby reducing exhaust emissions.

To attain the above object, according to a first aspect of the present invention, there is provided an exhaust gas recirculation control system for an internal combustion engine that eliminates NOx in exhaust gases by a catalyst, and recirculates the exhaust gases into an intake system, the exhaust gas recirculation control system comprising:
operating condition-detecting means for detecting operating conditions of the engine;
catalyst performance-estimating means for estimating NOx-eliminating performance of the catalyst; and
exhaust gas recirculation rate-setting means for setting, in response to the detected operating conditions of the engine and the estimated NOx-eliminating performance, an exhaust gas recirculation rate at which the exhaust gases are recirculated into the intake system.

According to this exhaust gas recirculation control system for an internal combustion engine, the operating conditions of the engine are detected, and the NOx-eliminating performance of the catalyst is estimated. Then, the exhaust gas recirculation rate at which the exhaust gases are recirculated into the intake system is set in response to the detected operating conditions and the estimated NOx-eliminating performance. Since the actual NOx-eliminating performance of the catalyst is estimated and the exhaust gas recirculation rate is controlled, at all times, in response to the estimated NOx-eliminating performance, differently from the prior art, the exhaust gas recirculation control system of the invention is capable of preventing NOx from flowing into the catalyst at a flow rate far beyond the NOx-eliminating performance of the catalyst. This makes it possible to reduce the amount of NOx contained in exhaust gases after treatment by the catalyst, whereby exhaust emissions can be minimized.

Preferably, the exhaust gas recirculation control system further comprises catalyst temperature-estimating means for estimating a temperature of the catalyst based on at least the detected operating conditions of the engine, and the catalyst performance-estimating means estimates the NOx-eliminating performance of the catalyst, according to the estimated temperature of the catalyst.

According to this preferred embodiment, the temperature of the catalyst is estimated based on the operating conditions of the engine, and then the NOx-eliminating performance of the catalyst is estimated according to the estimated temperature of the catalyst. The NOx-eliminating performance of the catalyst depends on the temperature thereof. Therefore, the NOx-eliminating performance of the catalyst can be properly estimated according to the catalyst temperature.

Preferably, the exhaust gas recirculation control system further comprises uneliminated NOx estimate-calculating means for calculating an uneliminated NOx estimate which is defined as an amount of NOx estimated to be emitted from the catalyst without being eliminated thereby, based on the NOx-eliminating performance estimated by the catalyst performance-estimating means, the uneliminated NOx estimate-calculating means calculating a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and when the present value of the uneliminated NOx estimate is larger than the second predicted value, the exhaust gas recirculation rate-setting means sets the exhaust gas recirculation rate to the value of the exhaust gas recirculation rate decreased from the present value thereof by the predetermined value, whereas when the present value of the uneliminated NOx estimate is equal to or smaller than the second predicted value and at the same time larger than the first predicted value, the exhaust gas recirculation rate-setting means sets the exhaust gas recirculation rate to the value of the exhaust gas recirculation rate increased from the present value thereof by the predetermined value.

More preferably, the catalyst performance-estimating means includes estimated NOx elimination ratio-calculating means for calculating an estimated NOx elimination ratio to which NOx flowing into the catalyst is estimated to be reduced by the catalyst, according to the estimated temperature of the catalyst, and the uneliminated NOx estimate-calculating means calculates a NOx exhaust estimate which is defined as an amount of NOx estimated to be emitted from the engine and flow into the catalyst, based on the operating conditions of the engine and the exhaust gas recirculation rate, and calculates the uneliminated NOx estimate based on the calculated NOx exhaust estimate and the calculated estimated NOx elimination ratio.

To attain the above object, according to a second aspect of the invention, there is provided an exhaust gas recirculation control system for an internal combustion engine that eliminates NOx in exhaust gases by a catalyst, and recirculates the exhaust gases into an intake system, the exhaust gas recirculation control system comprising:
an operating condition-detecting module for detecting operating conditions of the engine;
a catalyst performance-estimating module for estimating NOx-eliminating performance of the catalyst; and
an exhaust gas recirculation rate-setting module for setting, in response to the detected operating conditions of the engine and the estimated NOx-eliminating performance, an exhaust gas recirculation rate at which the exhaust gases are recirculated into the intake system.

According to the second aspect of the invention, the same advantageous effects as provided by the first aspect of the invention can be obtained.

Preferably, the exhaust gas recirculation control system further comprises a catalyst temperature-estimating module for estimating a temperature of the catalyst based on at least the detected operating conditions of the engine, and the catalyst performance-estimating module estimates the NOx-eliminating performance of the catalyst, according to the estimated temperature of the catalyst.

According to this preferred embodiment, the same advantageous effects as provided by the corresponding preferred embodiment of the first aspect of the invention can be obtained.

Preferably, the exhaust gas recirculation control system further comprises an uneliminated NOx estimate-calculating module for calculating an uneliminated NOx estimate which is defined as an amount of NOx estimated to be emitted from the catalyst without being eliminated thereby, based on at least the NOx-eliminating performance estimated by the catalyst performance-estimating module, the uneliminated NOx estimate-calculating module calculating a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and when the present value of the uneliminated NOx estimate is larger than the second predicted value, the exhaust gas recirculation rate-setting module sets the exhaust gas recirculation rate to the value of the exhaust gas recirculation rate decreased from the present value thereof by the predetermined value, whereas when the present value of the uneliminated NOx estimate is equal to or smaller than the second predicted value and at the same time larger than the first predicted value, the exhaust gas recirculation rate-setting module sets the exhaust gas recirculation rate to the value of the exhaust gas recirculation rate increased from the present value thereof by the predetermined value.

More preferably, the catalyst performance-estimating module includes an estimated NOx elimination ratio-calculating module for calculating an estimated NOx elimination ratio to which NOx flowing into the catalyst is estimated to be reduced by the catalyst, according to the estimated temperature of the catalyst, and the uneliminated NOx estimate-calculating module calculates a NOx exhaust estimate which is defined as an amount of NOx estimated to be emitted from the engine and flow into the catalyst, based on the operating conditions of the engine and the exhaust gas recirculation rate, and calculates the uneliminated NOx estimate based on the calculated NOx exhaust estimate and the calculated estimated NOx elimination ratio.

To attain the above object, according to a third aspect of the invention, there is provided a method of controlling an exhaust gas recirculation rate for an internal combustion engine that eliminates NOx in exhaust gases by a catalyst, and recirculates the exhaust gases into an intake system, the method comprising the steps of:
detecting operating conditions of the engine;
estimating NOx-eliminating performance of the catalyst; and
setting, in response to the detected operating conditions of the engine and the estimated NOx-eliminating performance, an exhaust gas recirculation rate at which the exhaust gases are recirculated into the intake system.

According to the third aspect of the invention, the same advantageous effects as provided by the first aspect of the invention can be obtained.

Preferably, the method further comprises the step of estimating a temperature of the catalyst based on at least the detected operating conditions of the engine, and the step of estimating the NOx-eliminating performance of the catalyst includes estimating the NOx-eliminating performance of the catalyst, according to the estimated temperature of the catalyst.

According to this preferred embodiment, the same advantageous effects as provided by the corresponding preferred embodiment of the first aspect of the invention can be obtained.

Preferably, the method further comprises the step of calculating an uneliminated NOx estimate which is defined as an amount of NOx estimated to be emitted from the catalyst without being eliminated thereby, based on at least the NOx-eliminating performance estimated in the step of estimating NOx-eliminating performance of the catalyst, the step of calculating an uneliminated NOx estimate including calculating a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and when the present value of the uneliminated NOx estimate is larger than the second predicted value, the step of setting an exhaust gas recirculation rate includes setting the exhaust gas recirculation rate to the value of the exhaust gas recirculation rate decreased from the present value thereof by the predetermined value, whereas when the present value of the uneliminated NOx estimate is equal to or smaller than the second predicted value and at the same time larger than the first predicted value, the step of setting an exhaust gas recirculation rate includes setting the exhaust gas recirculation rate to the value of the exhaust gas recirculation rate increased from the present value thereof by the predetermined value.

More preferably, the step of estimating NOx-eliminating performance of the catalyst includes the step of calculating an estimated NOx elimination ratio to which NOx flowing into the catalyst is estimated to be reduced by the catalyst, according to the estimated temperature of the catalyst, and the step of calculating an uneliminated NOx estimate includes calculating a NOx exhaust estimate which is defined as an amount of NOx estimated to be emitted from the engine and flow into the catalyst, based on the operating conditions of the engine and the exhaust gas recirculation rate, and calculating the uneliminated NOx estimate based on the calculated NOx exhaust estimate and the calculated estimated NOx elimination ratio.

To attain the above object, according to a fourth aspect of the invention, there is provided an engine control unit including a control program for causing a computer to carry out exhaust gas recirculation rate control for an internal combustion engine that eliminates NOx in exhaust gases by a catalyst, and recirculates the exhaust gases into an intake system, wherein the control program causes the computer to detect operating conditions of the engine, estimate NOx-eliminating performance of the catalyst, and set, in response to the detected operating conditions of the engine and the estimated NOx-eliminating performance, an exhaust gas recirculation rate at which the exhaust gases are recirculated into the intake system.

According to the fourth aspect of the invention, the same advantageous effects as provided by the first aspect of the invention can be obtained.

Preferably, the control program causes the computer to estimate a temperature of the catalyst based on at least the detected operating conditions of the engine, and when causing the computer to estimate the NOx-eliminating performance of the catalyst, causes the computer to estimate the NOx-eliminating performance of the catalyst, according to the estimated temperature of the catalyst.

According to this preferred embodiment, the same advantageous effects as provided by the corresponding preferred embodiment of the first aspect of the invention can be obtained.

Preferably, the control program causes the computer to calculate the uneliminated NOx estimate which is defined as an amount of NOx estimated to be emitted from the catalyst without being eliminated thereby, based on at least the NOx-eliminating performance estimated by causing the computer to estimate the NOx-eliminating performance of the catalyst, the control program causing the computer to calculate a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and when the present value of the uneliminated NOx estimate is larger than the second predicted value, the control program causes the computer to set the exhaust gas recirculation rate to the value of the exhaust gas recirculation rate decreased from the present value thereof by the predetermined value, whereas when the present value of the uneliminated NOx estimate is equal to or smaller than the second predicted value and at the same time larger than the first predicted value, the control program causes the computer to set the exhaust gas recirculation rate to the value of the exhaust gas recirculation rate increased from the present value thereof by the predetermined value.

More preferably, when causing the computer to estimate the NOx-eliminating performance of the catalyst, the control program causes the computer to calculate an estimated NOx elimination ratio to which NOx flowing into the catalyst is estimated to be reduced by the catalyst, according to the estimated temperature of the catalyst, and when causing the computer to calculate the uneliminated NOx estimate, the control program causes the computer to calculate a NOx exhaust estimate which is defined as an amount of NOx estimated to be emitted from the engine and flow into the catalyst, based on the operating conditions of the engine and the exhaust gas recirculation rate, and calculate the uneliminated NOx estimate based on the calculated NOx exhaust estimate and the calculated estimated NOx elimination ratio.

The above and other objects, features, and advantages of the invention will become more apparent from the following detailed description taken in conjunction with the accompanying drawings.

DETAILED DESCRIPTION OF PREFERRED EMBODIMENT

Figure 1:
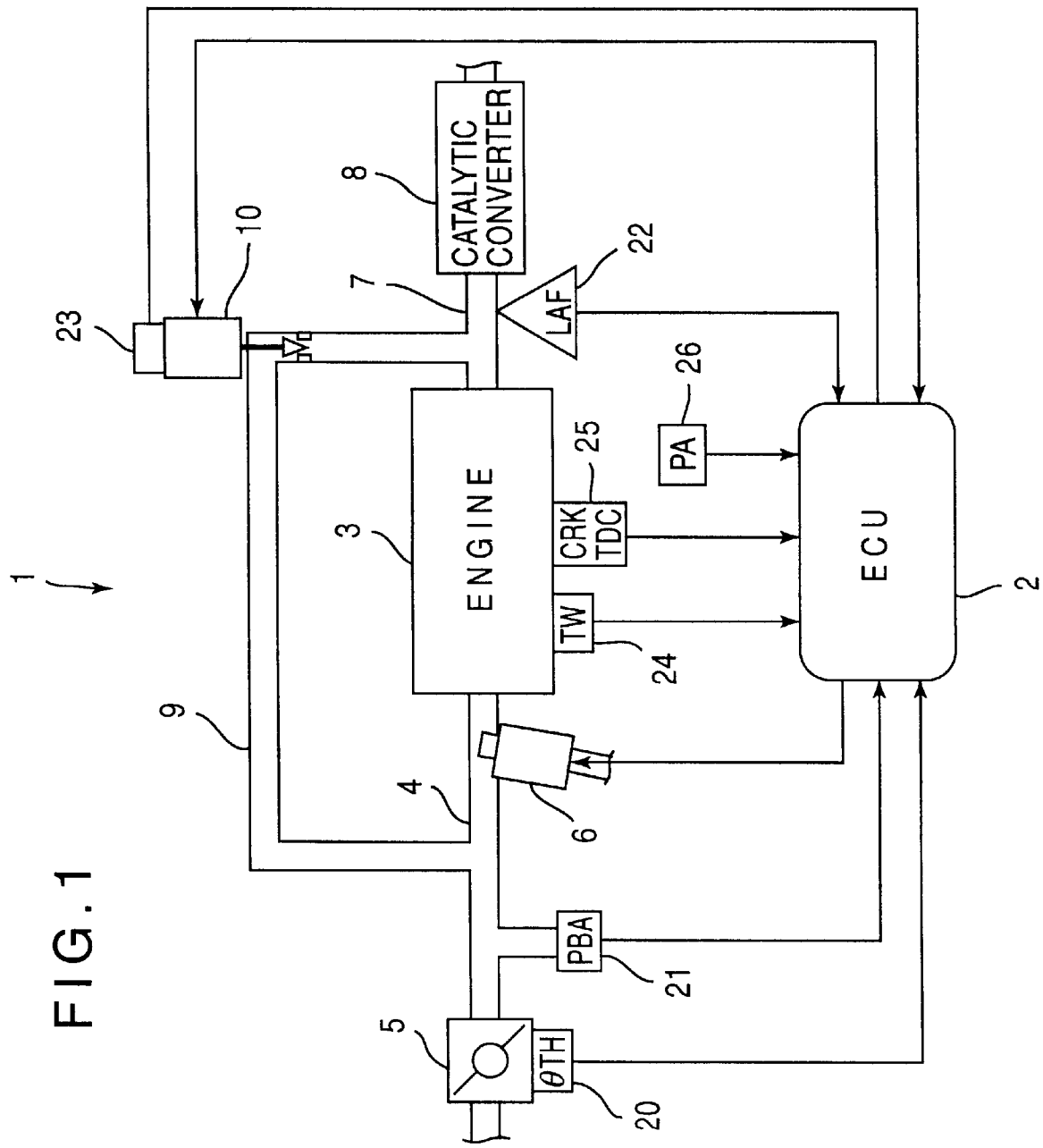
FIG. 1 is a block diagram schematically showing the arrangement of an internal combustion engine incorporating an exhaust gas recirculation control system according to an embodiment of the invention.

The invention will now be described in detail with reference to the drawings showing a preferred embodiment thereof. Referring first to FIG. 1, there is schematically shown the arrangement of an internal combustion engine incorporating an exhaust gas recirculation control system according to the embodiment of the invention. "Exhaust gas recirculation" is hereinafter referred to as "EGR". As shown in the figure, the EGR control system 1 includes an ECU 2 which executes EGR control based on operating conditions of the internal combustion engine (hereinafter simply referred to as "the engine") 3.

The engine 3 is installed on an automotive vehicle, not shown, and includes an intake pipe 4 (intake system) having a throttle valve 5 and injectors 6 (only one of which is shown in the figure) arranged in an intermediate portion thereof. The degree of opening of the throttle valve 5 (hereinafter referred to as "the throttle valve opening") θ TH is controlled by an electric motor, not shown, connected to the throttle valve 5. Further, a throttle valve opening sensor 20 for detecting the throttle valve opening θ TH is connected to the throttle valve 5. The throttle valve opening sensor 20 delivers an electric signal indicative of the sensed throttle valve opening θ TH to the ECU 2.

On the other hand, a fuel injection time period over which the injector 6 injects fuel into the intake pipe 4 is controlled by a drive signal delivered from the ECU 2.

An intake pipe absolute pressure sensor 21 is provided in communication with the interior of the intake pipe 4 at a location downstream of the throttle valve 5. The intake pipe absolute pressure sensor 21 (operating condition-detecting means) formed e.g. by a semiconductor pressure sensor detects pressure within the intake pipe 4 as an intake pipe absolute pressure PBA and supplies an electric signal indicative of the sensed absolute pressure PBA to the ECU 2.

Arranged in an intermediate portion of an exhaust pipe 7 is a catalytic converter 8 (catalyst) formed by combining a three-way catalyst and a NOx adsorbing catalyst. The catalytic converter 8 eliminates NOx, CO and HC contained in exhaust gases exhausted from the engine 3.

A LAF sensor 22 is arranged in the exhaust pipe 7 at a location upstream of the catalytic converter 8. The LAF sensor 22 is comprised of a zirconia layer and a platinum electrode, and detects the concentration of oxygen within exhaust gases in a wide range of the air-fuel ratio A/F of an air-fuel mixture ranging from a rich region in which the air-fuel ratio of the mixture is richer than the stoichiometric air-fuel ratio to an extremely lean region in which the former is far learner than the latter, to deliver a signal substantially proportional to the sensed oxygen concentration to the ECU 2.

An EGR pipe 9 extends to connect between a portion of the intake pipe 4 downstream of the throttle valve 5 and a portion of the exhaust pipe 7 upstream of the three-way catalytic converter 8. In an intermediate portion of the EGR pipe 9, there is mounted an EGR control valve 10. The EGR control valve 10 performs control of EGR operation for recirculating exhaust gases from the engine 3 to the intake pipe 4, and is formed by a linear electromagnetic valve. The valve lift amount of the EGR control valve 10 is linearly changed in response to a drive signal from the ECU 5, whereby the degree of opening of the EGR pipe 9 is linearly changed. In this case, as the valve lift amount of the EGR control valve 10 is larger, the rate at which exhaust gases are recirculated into the intake pipe 4 via the EGR pipe 9, i.e. the EGR rate, is larger.

Further, the EGR control valve 10 is provided with a valve lift sensor 23 for detecting an actual valve lift amount LACT. The valve lift sensor 23 delivers to the ECU 5 a signal indicative of the sensed actual valve lift amount LACT.

The engine 3 has an engine coolant temperature sensor 24 and a crank angle position sensor 25 mounted therein. The engine coolant temperature sensor 24 is formed by a thermistor or the like and senses an engine coolant temperature TW which is a temperature of an engine coolant circulating within the cylinder block of the engine 3, to deliver an electric signal indicative of the sensed engine coolant temperature TW to the ECU 5.

The crank angle position sensor 25 (operating condition-detecting means) is formed by a combination of a magnet rotor, not shown, and an MRE pickup, not shown, and delivers a CRK signal and a TDC signal to the ECU 2 whenever a crankshaft, not shown, of the engine 3 rotates through respective predetermined angles. The CRK signal is indicative of the sensed rotational angle of the crankshaft and each pulse thereof is generated whenever the crankshaft rotates through a predetermined angle (e.g. 30 degrees). The ECU 2 calculates a rotational speed NE of the engine 3 based on the CRK signal. On the other hand, each pulse of the TDC signal is generated at a predetermined crank angle position of each cylinder in the vicinity of a top dead center position at the start of an intake stroke of a piston, not shown, in the cylinder whenever the crankshaft rotates through a predetermined angle (e.g. 180 degrees in the case of a four-cylinder engine).

Further, connected to the ECU 2 is an atmospheric pressure sensor 26 for detecting an atmospheric pressure PA. The atmospheric pressure sensor 26 delivers a signal indicative of the sensed atmospheric pressure PA to the ECU 2.

The ECU 2 (operating condition-detecting means, catalyst performance-estimating means, exhaust gas recirculation rate-setting means, catalyst temperature-estimating means) is formed by a microcomputer including a CPU, a RAM, a ROM, and an I/O interface, none of which are specifically shown. The signals delivered from the sensors 20 to 26 to the ECU 2 are each input to the I/O interface for A/D conversion and waveform shaping, and then input into the CPU. The CPU determines the operating conditions of the engine 3 based on the signals, and executes EGR control based on control programs stored in the ROM in advance, and data stored in the RAM.

Figure 2:
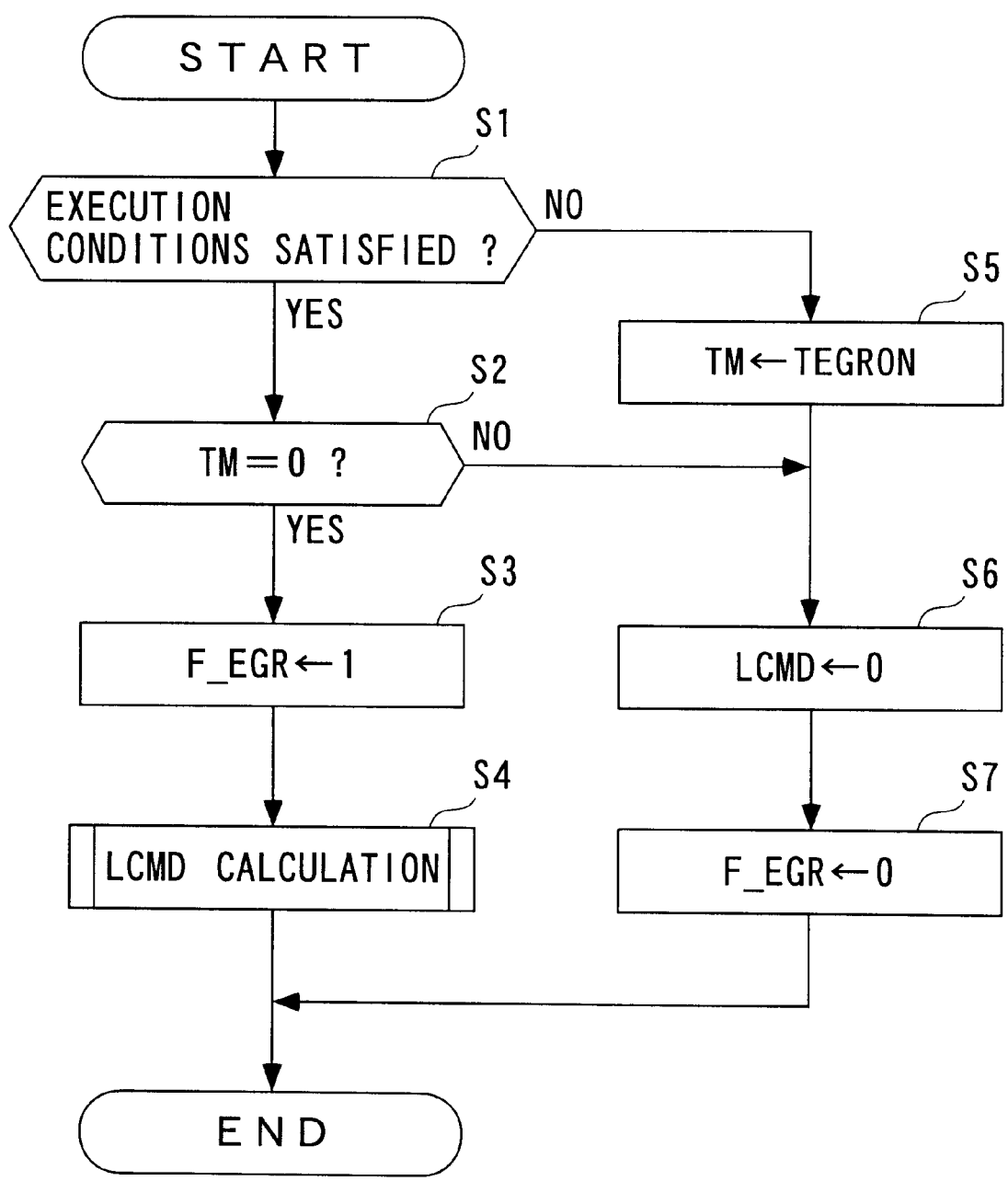
FIG. 2 is a flowchart of a routine for carrying out an EGR control process.

In the following, the EGR control process executed by the ECU 2 will be described with reference to a flowchart shown in FIG. 2. This process is carried out whenever a TDC signal is input to the ECU 2.

In the present process, first, it is determined in a step S1 whether or not conditions for executing EGR are satisfied. In the step S1, it is determined that the conditions for executing EGR are satisfied, for example, when feedback control of the air-fuel ratio A/F of the mixture is being executed in response to a signal from the LAF sensor 22, that the engine 3 is not performing fuel-cut operation, and that the throttle valve 5 is not in a fully-opened state.

If the answer to the question of the step S1 is affirmative (Yes), i.e. if the conditions for executing EGR are satisfied, the program proceeds to a step S2, wherein it is determined whether or not the timer count TM of an EGR timer is equal to "0". The EGR timer has the function of counting a time period elapsed after the conditions for executing EGR were satisfied. This timer is formed by a downcount timer, and the timer count TM is set to a predetermined time period TEGRON in a step S5, referred to hereinafter. If the answer to the question of the step S2 is affirmative (Yes), which means that the predetermined time period TEGRON has elapsed after satisfaction of the above conditions, it is judged that the engine 3 is in an operating condition in which EGR can be suitably carried out, and the program proceeds to a step S3, wherein an EGR execution flag F_EGR is set to "1" to indicate that the engine is performing EGR.

Then, the program proceeds to a step S4, and a target valve lift amount LCMD is calculated, followed by terminating the program. The EGR rate is controlled based on the target valve lift amount LCMD. More specifically, the EGR control valve 10 is controlled such that the actual valve lift amount LACT becomes equal to the target valve lift amount LCMD, to thereby performing feedback-control of the EGR rate. The process for calculating the target valve lift amount LCMD will be described in detail hereinafter.

On the other hand, if the answer to the question of the step S1 is negative (No), i.e. if the conditions for executing EGR are not satisfied, the program proceeds to the step S5, wherein the timer count TM of the EGR timer is set to the predetermined time period TEGRON (e.g. 200 to 500 msec.).

Then, the program proceeds to a step S6, wherein the target valve lift amount LCMD of the EGR control valve 10 is set to "0". As a result, the EGR pipe 9 is closed by the EGR control valve 10 to inhibit execution of EGR. Then, the program proceeds to a step S7, wherein the EGR execution flag F_EGR is set to "0" so as to indicate that the engine is not performing EGR, followed by terminating the program.

If the answer to the question of the step S2 is negative (No), i.e. when the EGR timer has not completed counting of the predetermined time period TEGRON, the above steps S6 and S7 are also executed, followed by terminating the program.

Figure 3:
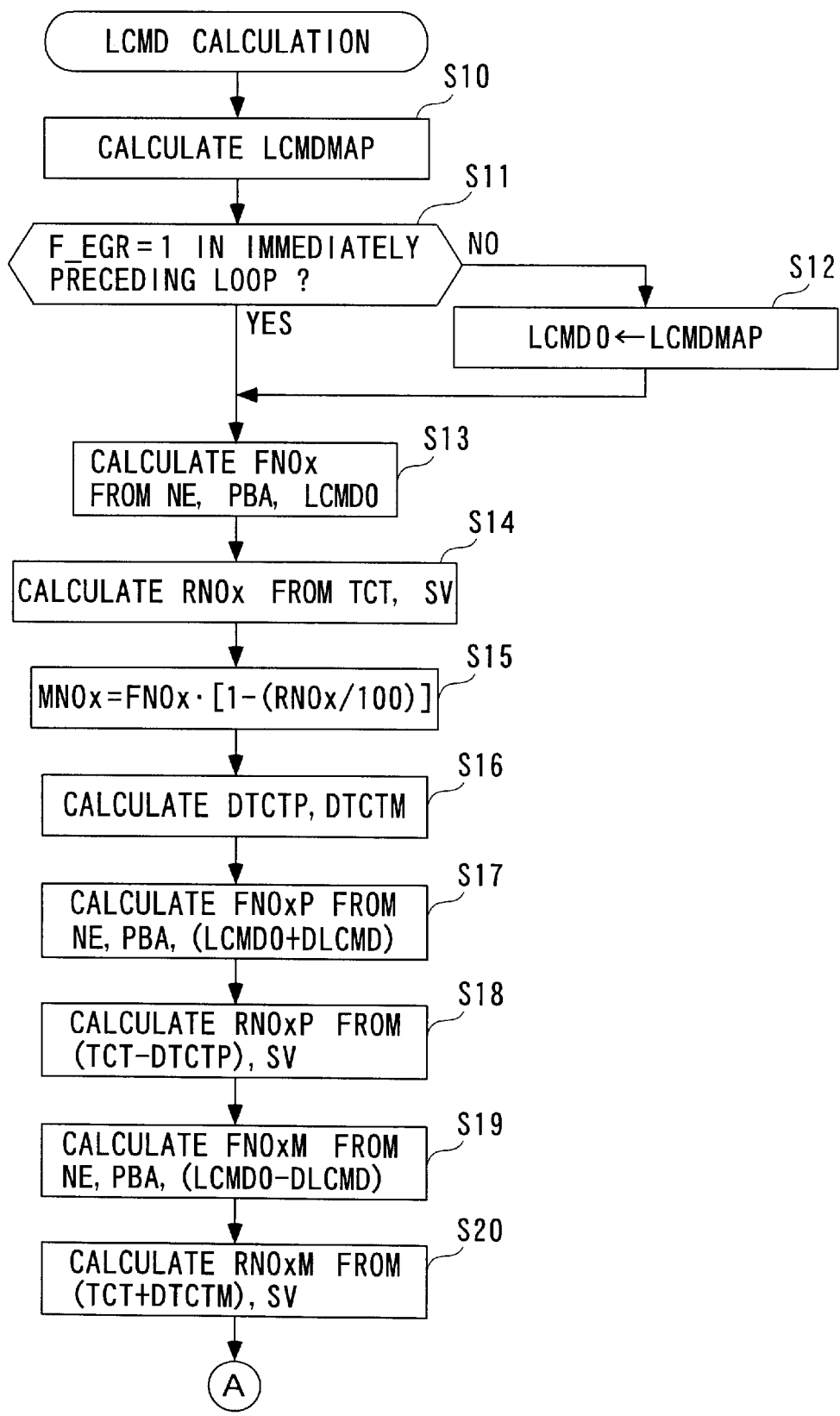
FIG. 3 is a flowchart of a subroutine for calculating a target valve lift amount LCMD, which is executed in a step S4 in FIG. 2.

Next, the process for calculating the target valve lift amount LCMD, which is executed in the step S4, will be described with reference to a flowchart shown in FIGS. 3 and 4.

In this process, first in a step S10, a basic target valve lift amount LCMDMAP is calculated by retrieval from a map, not shown, according to the engine rotational speed NE and the intake pipe absolute pressure PBA. Then, the program proceeds to a step S11, wherein it is determined whether or not the EGR execution flag F_EGR was set to "1" in the immediately preceding loop.

If the answer to the question of the step S11 is negative (No), which means that the present loop is a first one for executing EGR, the program proceeds to a step S12, wherein the preceding value LCMD0 of the target valve lift amount is set to the basic target valve lift amount LCMDMAP, followed by the program proceeding to a step S13. On the other hand, if the answer to the question of the step S11 is affirmative (Yes), which means that EGR was executed in the immediately preceding loop, the program skips over the step S12 to the step S13.

In the step S13, a NOx exhaust estimate FNOx is calculated by retrieval from a map, not shown, according to the engine rotational speed NE, the intake pipe absolute pressure PBA, and the preceding value LCMD0 of the target valve lift amount. The NOx exhaust estimate FNOx is indicative of the amount of NOx estimated to be exhausted from the engine 3 to the catalytic converter 8. The map is configured such that the NOx exhaust estimate FNOx becomes smaller as the preceding value LCMD0 is larger, and becomes larger as the engine rotational speed NE or the intake pipe absolute pressure PBA is larger.

Figure 5:
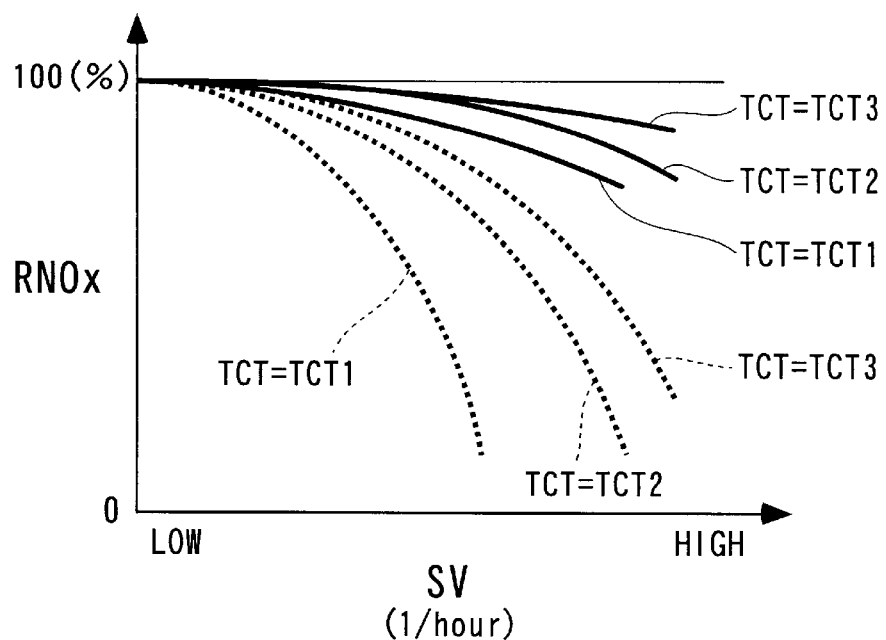
FIG. 5 shows an example of a map for use in calculating an estimated NOx elimination ratio RNOx.

Then, the program proceeds to a step S14, wherein an estimated NOx elimination ratio RNOx is calculated by retrieval from a map shown in FIG. 5, according to an estimated catalyst temperature TCT and a space velocity SV through the catalytic converter. The estimated NOx elimination ratio RNOx is indicative of the ratio (%) of the amount of NOx estimated to be eliminated by the catalytic converter 8 to the amount of NOx contained in exhaust gases exhausted to the catalytic converter 8. Further, the space velocity SV (1/h) is indicative of an amount of exhaust gases flowing through the catalyst per unit time. The space velocity SV is calculated, based on the engine rotational speed NE, the intake pipe absolute pressure PBA, the atmospheric pressure PA, an engine displacement VE and a catalyst volume VCAT, by using the following equation (1):

$$SV=[(VE/2) \cdot NE \cdot 60 \cdot (PBA/PA)]/VCAT \qquad (1)$$

As shown in FIG. 5, three kinds of maps are provided according to the estimated catalyst temperature TCT in a manner associated with respective predetermined temperatures TCT1 to TCT3. The relationship between the three predetermined temperatures TCT1 to TCT3 is defined as TCT1<TCT2<TCT3. Further, each of the three maps includes two kinds provided according to a parameter, such as the oxygen storage capacity of the catalytic converter 8, which reflects the degree of degradation of the catalytic converter 8. One of the two maps is for use with a newer catalyst having a larger oxygen storage capacity, which is indicated by a solid line, and the other is for use with an aged catalyst having a smaller oxygen storage capacity, which is indicated by a broken line. These maps are each configured such that the estimated NOx elimination ratio RNOx becomes lower as the space velocity SV is larger. This is because the flow rate of exhaust gases passing through the catalytic converter 8 is increased with an increase in the space velocity SV, which causes an increase in the amount of NOx which cannot be eliminated by the catalytic converter 8. Further, the estimated NOx elimination ratio RNOx is set to a smaller value as the estimated catalyst temperature TCT is lower. This is because as the estimated catalyst temperature TCT is lower, the degree of activation of the catalytic converter 8 becomes lower, which causes an increase in the amount of NOx which cannot be eliminated by the catalytic converter 8. When the estimated catalyst temperature TCT and the oxygen storage capacity of the catalyst assume respective values between values employed in the maps, the estimated NOx elimination ratio RNOx is calculated by interpolation according to the relationship of the values with respect to the values employed in the maps.

Then, the program proceeds to a step S15, wherein an uneliminated NOx estimate MNOx is calculated, based on the NOx exhaust estimate FNOx and the estimated NOx elimination ratio RNOx obtained at the respective steps S13 and S14, by using the following equation (2):

$$MNOx=FNOx \cdot [1-(RNOx/100)] \qquad (2)$$

The uneliminated NOx estimate MNOx is indicative of the amount of NOx estimated to remain uneliminated by the catalytic converter 8.

Figure 6:
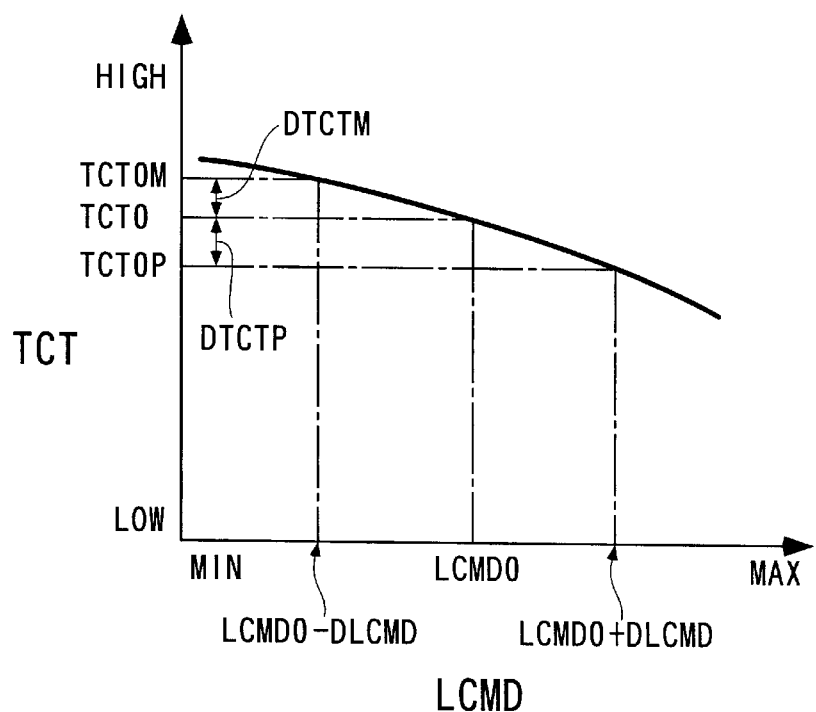
FIG. 6 shows an example of a table for use in calculating an incremental-side temperature difference DTCTP and a decremental-side temperature difference DTCTM.

Then, the program proceeds to a step S16, wherein an incremental-side temperature difference DTCTP and a decremental-side temperature difference DTCTM are calculated by retrieval from a table shown in FIG. 6, according to the immediately preceding value LCMD0 of the target valve lift amount and a value LCMD0±DLCMD obtained by adding or subtracting a predetermined value DLCMD to or from the immediately preceding value LCMD0. The table sets changes in the estimated catalyst temperature TCT with respect to the target valve lift amount LCMD such that as the target valve lift amount LCMD is larger, the estimated catalyst temperature TCT becomes lower. This is because as the target valve lift amount LCMD is larger, the EGR rate becomes higher, which causes the combustion temperature of the mixture to be lowered. The incremental-side temperature difference DTCTP corresponds to a drop in the estimated catalyst temperature TCT calculated on the assumption that the target valve lift amount in the present loop is increased from the immediately preceding value LCMD0 by the predetermined value DLCMD, i.e. that the EGR rate is slightly increased. More specifically, as shown in the figure, the incremental-side temperature difference DTCTP is calculated as the difference (TCT0−TCT0P) between an estimated catalyst temperature value TCT0 obtained when the target valve lift amount LCMD is equal to the value LCMD0 and an estimated catalyst temperature value TCT0P obtained when the target valve lift amount LCMD is equal to the valve LCMD0+DLCMD.

On the other hand, the decremental-side temperature difference DTCTM corresponds to a rise in the estimated catalyst temperature TCT calculated on the assumption that the target valve lift amount in the present loop is reduced from the immediately preceding value LCMD0 by the predetermined value DLCMD, i.e. that the EGR rate is slightly reduced. More specifically, as shown in the figure, the decremental-side temperature difference DTCTM is calculated as the difference (TCT0M−TCT0) between an estimated catalyst temperature value TCT0M obtained when the target valve lift amount LCMD is equal to the value LCMD0−DLCMD and the estimated catalyst temperature value TCT0 obtained when the target valve lift amount LCMD is equal to the value LCMD0.

Then, the program proceeds to a step S17, wherein similarly to the step S13, an incremental-side NOx exhaust estimate FNOxP is calculated by retrieval from the map, not shown, according to the engine rotational speed NE, the intake pipe absolute pressure PBA, and the preceding value LCMD0 of the target valve lift amount. More specifically, the incremental-side NOx exhaust estimate FNOxP is determined as a value of the NOx exhaust estimate FNOx calculated on the assumption that the target valve lift amount LCMD is increased from the immediately preceding value LCMD0 by the predetermined value DLCMD.

Then, the program proceeds to a step S18, wherein similarly to the step S14, an incremental-side estimated NOx elimination ratio RNOxP is calculated by retrieval from the FIG. 5 map, according to a value (TCT−DTCTP) obtained by subtracting the incremental-side temperature difference DTCTP from the estimated catalyst temperature TCT, and the space velocity SV. More specifically, the incremental-side estimated NOx elimination ratio RNOxP is obtained as a value of the estimated NOx elimination ratio RNOx calculated on the assumption that the target valve lift amount LCMD is increased from the immediately preceding value LCMD0 by the predetermined value DLCMD.

Then, the program proceeds to a step S19, wherein similarly to the step S13, a decremental-side NOx exhaust estimate FNOxM is calculated by retrieval from the map, not shown, according to the engine rotational speed NE, the intake pipe absolute pressure PBA, and a value (LCMD0−DLCMD) obtained by subtracting the predetermined value DLCMD from the immediately preceding value LCMD0 of the target valve lift amount. More specifically, the decremental-side NOx exhaust estimate FNOxM is determined as a value of the NOx exhaust estimate FNOx calculated on the assumption that the target valve lift amount LCMD is reduced from the immediately preceding value LCMD0 by the predetermined value DLCMD.

Then, the program proceeds to a step S20, wherein similarly to the step S14, a decremental-side estimated NOx elimination ratio RNOxM is calculated by retrieval from the FIG. 5 map, according to a value (TCT+DTCTM) obtained by adding the decremental-side temperature difference DTCTM to the estimated catalyst temperature TCT, and the space velocity SV. More specifically, the decremental-side estimated NOx elimination ratio RNOxM is determined as a value of the estimated NOx elimination ratio RNOx calculated on the assumption that the target valve lift amount LCMD is reduced from the immediately preceding value LCMD0 by the predetermined value DLCMD.

Figure 4:
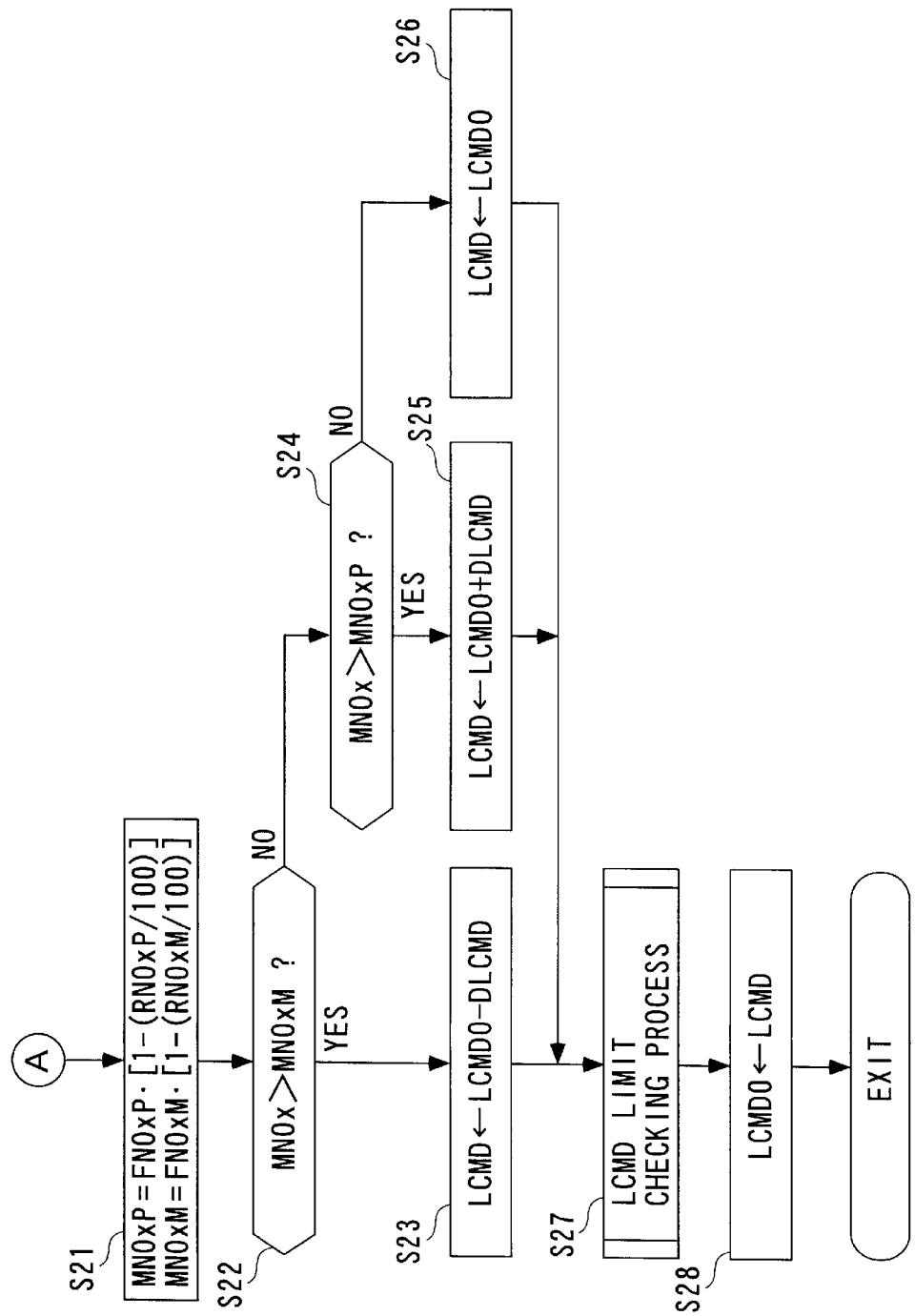
FIG. 4 is a continuation of the FIG. 3 flowchart.

Then, the program proceeds to a step S21 in FIG. 4, wherein an incremental-side uneliminated NOx estimate MNOxP and a decremental-side uneliminated NOx estimate MNOxM are calculated, based on the values obtained at the above steps S17 to S20, by using the respective following equations (3) and (4):

$$MNOxP = FNOxP \cdot [1 - (RNOxP/100)] \quad (3)$$

$$MNOxM = FNOxM \cdot [1 - (RNOxM/100)] \quad (4)$$

The uneliminated NOx estimates MNOxP and MNOxM are each indicative of an amount of NOx estimated to remain uneliminated by the catalytic converter 8 on the assumption that the target valve lift amount LCMD is increased or reduced from the immediately preceding value LCMD0 by the predetermined value DLCMD.

Then, the program proceeds to a step S22, wherein it is determined whether or not the uneliminated NOx estimate MNOx calculated in the step S15 is larger than the decremental-side uneliminated NOx estimate MNOxM calculated in the step S21. If the answer to the question is affirmative (Yes), i.e. if it is estimated that the amount of NOx remaining or uneliminated by the catalytic converter 8 becomes smaller when the target valve lift amount LCMD is reduced from the immediately preceding value LCMD0 by the predetermined value DLCMD than when the target valve lift amount LCMD is held equal to the value LCMD0, the program proceeds to a step S23, wherein the present value LCMD of the target valve lift amount is set to the value (LCMD0−DLCMD) obtained by subtracting the predetermined value DLCMD from the immediately preceding value LCMD0 of the target valve lift amount.

On the other hand, if the answer to the question of the step S22 is negative (No), the program proceeds to a step S24, wherein it is determined whether or not the uneliminated NOx estimate MNOx is larger than the incremental-side uneliminated NOx estimate MNOxP. If the answer to the question is affirmative (Yes), i.e. if it is estimated that the amount of NOx remaining or uneliminated by the catalytic converter 8 becomes smaller when the target valve lift amount LCMD is increased from the immediately preceding value LCMD0 by the predetermined value DLCMD than when the target valve lift amount LCMD is held equal to the value LCMD0, the program proceeds to a step S25, wherein the present value LCMD of the target valve lift amount is set to the value (LCMD0+DLCMD) obtained by adding the predetermined value DLCMD to the immediately preceding value LCMD0.

If the answer to the question of the step S24 is negative (No), i.e. if it is estimated that when the target valve lift amount LCMD is reduced or increased from the immediately preceding value LCMD0 by the predetermined value DLCMD, the amount of NOx remaining or uneliminated by the catalytic converter 8 does not change or becomes larger than when the target valve lift amount LCMD is held equal to the value LCMD0, the program proceeds to a step S26, wherein the present value LCMD of the target valve lift amount is held at the immediately preceding value LCMD0.

In a step S27 following the step S23, S25 or S26, limit checking of the present value LCMD of the target valve lift amount is executed. In the limit checking process, if the present value LCMD of the target valve lift amount calculated in the step S23, S25 or S26 is within a range defined by a lower limit value LCMDLMTL and an upper limit value LCMDLMTH, the present value LCMD is maintained. If the calculated present value LCMD is larger than the upper limit value LCMDLMTH, the present value LCMD is set to the upper limit value LCMDLMTH, while if the present value LCMD is smaller than the lower limit value LCMDLMTL, the present value LCMD is set to the lower limit value LCMDLMTL.

Then, the program proceeds to a step S28, wherein the immediately preceding value LCMD0 of the target valve lift amount is set to the present value LCMD calculated in the step 27, followed by terminating the program.

Figure 7:
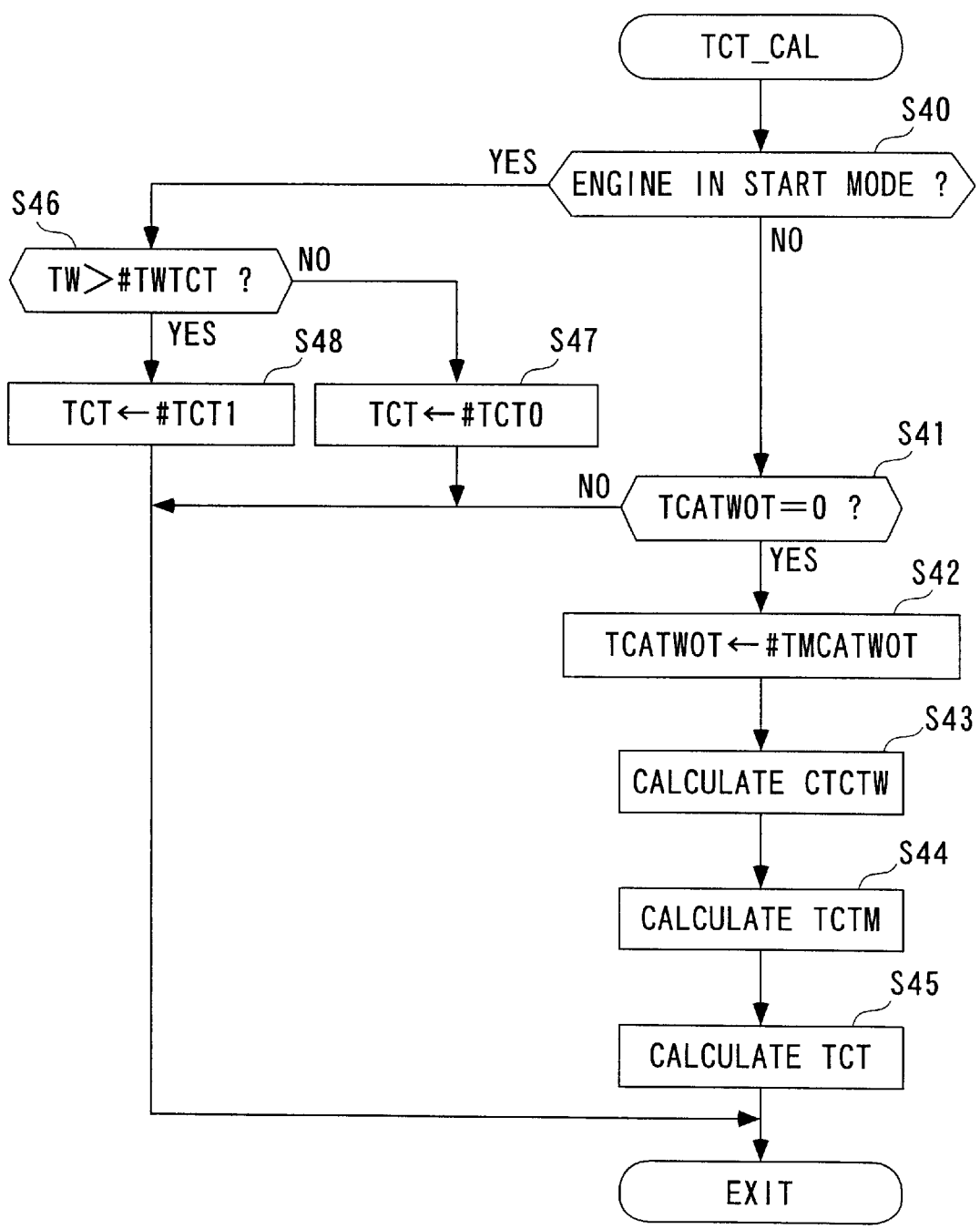
FIG. 7 is a flowchart of a routine for calculating an estimated catalyst temperature TCT.

Next, the process for calculating the estimated catalyst temperature TCT will be described with reference to a flowchart shown in FIG. 7. This process is executed at predetermined time intervals (e.g. of 10 msec.).

First, it is determined in a step S40 whether or not the engine 3 is in the start mode. In this step, for example, if the engine rotational speed NE is below a predetermined rotational speed (e.g. 500 rpm), it is determined that the engine 3 is in the start mode. If the answer to the question of the step S40 is affirmative (Yes), i.e. if the engine 3 is in the start mode, an initial value of the estimated catalyst temperature TCT is set in steps S46 et seq. More specifically, it is determined in the step S46 whether or not the engine coolant temperature TW is higher than a predetermined temperature #TWTCT (e.g. 60° C.).

If the answer to the question is negative (No), which means the engine 3 is in a low temperature condition, it is judged that the catalytic converter 8 is also is in a low temperature condition, so that the program proceeds to a step S47, wherein the estimated catalyst temperature TCT is set to an initial value #TCT0 (e.g. 200° C.) for low temperatures of the catalytic converter 8, followed by terminating the program. On the other hand, if the answer to the question of the step S46 is affirmative (Yes), it is judged that the catalytic converter 8 is in a high temperature condition, so that the program proceeds to a step S48, wherein the estimated catalyst temperature TCT is set to an initial value #TCT1 (e.g. 500° C.) for high temperatures of the catalytic converter 8, followed by terminating the program.

Further, if the answer to the question of the step S40 is negative (No), which means the start mode has been terminated, the temperature of the catalytic converter 8 is estimated at steps S41 et seq. More specifically, it is determined in the step S41 whether or not the count TCATWOT of a catalyst temperature-estimating timer is equal to "0". The catalyst temperature-estimating timer is formed by a downcount timer.

If the answer to the question is negative (No), the program is immediately terminated, whereas if the answer is affirmative (Yes), which means the catalyst temperature-estimating timer has completed counting of a predetermined time period #TMCATWOT, the program proceeds to a step S42, wherein the count TCATWOT of the catalyst temperature-estimating timer is set to the predetermined time period #TMCATWOT (e.g. 500 msec.), and then the process for calculating the estimated catalyst temperature TCT is carried out in steps S43 to S45 described below. In short, calculation of the estimated catalyst temperature TCT is executed at time intervals of the predetermined time period #TMCATWOT.

Figure 8:
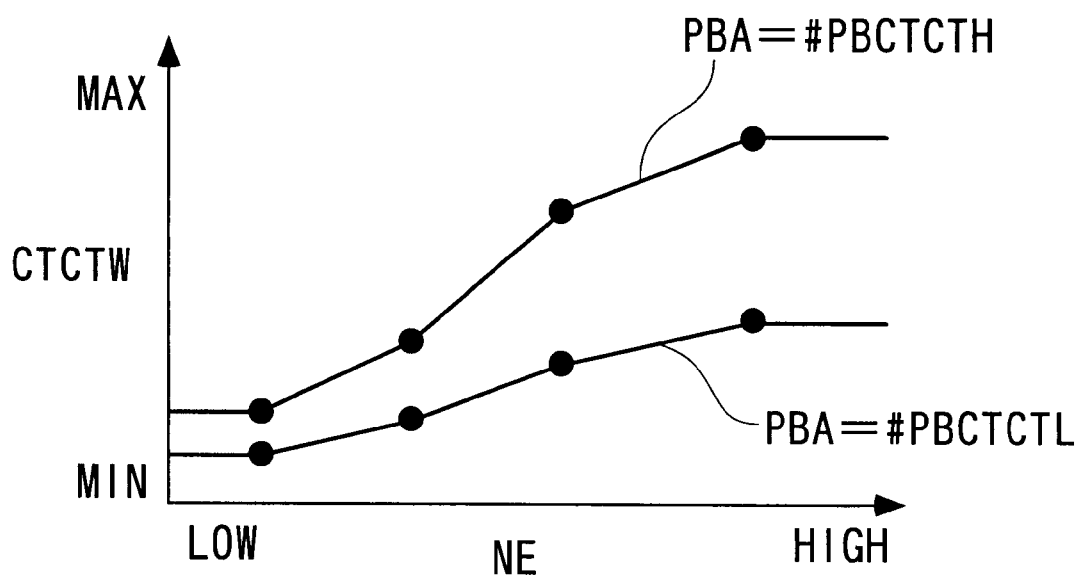
FIG. 8 shows an example of a table for use in calculating an averaging coefficient CTCTW.

In the step S43, an averaging coefficient CTCTW is calculated by retrieval from a table shown in FIG. 8, according to the engine rotational speed NE and the intake pipe absolute pressure PBA. As shown in the figure, there are provided two kinds of tables corresponding, respectively, to predetermined values #PBCTCTL and #PBCTCTH of the intake pipe absolute pressure PBA. One of the tables configured in association with the predetermined value #PBCTCTL is provided for use in low-load operation of the engine, and the other configured in association with the predetermined value #PBCTCTH is provided for use in high-load operation of the same. The tables are each configured such that the averaging coefficient CTCTW becomes larger as the engine rotational speed NE or the intake pipe absolute pressure PBA is higher. When the intake pipe absolute pressure PBA assumes a value between the predetermined values #PBCTCTL and #PBCTCTH, the averaging coefficient CTCTW is calculated by interpolation according to the value.

Then, the program proceeds to the step S44, wherein a basic estimated catalyst temperature TCTM is calculated by retrieval from a map, not shown, according to the engine rotational speed NE and the intake pipe absolute pressure PBA.

Then, the program proceeds to the step S45, wherein the present value TCT(n) of the estimated catalyst temperature TCT is calculated, based on the averaging coefficient CTCTW and the basic estimated catalyst temperature TCTM obtained at the respective steps S43 and S44, by using the following equation (5):

$$TCT(n)=TCT(n-1)+[TCTM-TCT(n-1)]\cdot CTCTW \qquad (5)$$

where TCT(n−1) represents the immediately preceding value of the estimated catalyst temperature TCT, followed by terminating the program.

According to the above equation (5), since the averaging coefficient CTCTW is set as above, when the temperature of the catalytic converter 8 is more likely to rise due to a high engine rotational speed NE or a high intake pipe absolute pressure PBA, the present value TCT(n) of the estimated catalyst temperature TCT can be properly estimated as a value reflecting the influence of the engine rotational speed NE or the intake pipe absolute pressure PBA.

As described heretofore, according to the EGR control system 1 of the present embodiment, the target valve lift amount LCMD is set such that the uneliminated NOx estimate MNOx, i.e. the amount of NOx estimated to remain uneliminated by the catalytic converter 8 is minimized, and the EGR control valve 10 is feedback-controlled such that the actual valve lift amount LACT becomes equal to the target valve lift amount LCMD. In short, the EGR rate is controlled such that the uneliminated NOx estimate MNOx is reduced. Thus, since the actual NOx-eliminating performance of the catalytic converter 8 is estimated at all times, and then the EGR rate is controlled based on the estimated NOx-eliminating performance. Therefore, differently from the prior art, the EGR control system 1 is capable of preventing NOx from flowing into the catalytic converter 8 at a flow rate far beyond the NOx-eliminating performance of the catalytic converter 8. This makes it possible to reduce the amount of NOx contained in exhaust gases treated by the catalytic converter 8, whereby exhaust emissions can be minimized.

Further, since the uneliminated NOx estimate MNOx is calculated by using the NOx exhaust estimate FNOx calculated based on the engine rotational speed NE, the intake pipe absolute pressure PBA, and the target valve lift amount LCMD, and the estimated NOx elimination ratio RNOx calculated based on the estimated catalyst temperature TCT and the space velocity SV, it is possible to estimate the NOx-eliminating performance of the catalytic converter 8 properly according to the temperature of the catalytic converter 8 and the conditions of exhaust gases.

Moreover, since the temperature of the catalytic converter 8 is estimated by a computer program therefor, it is possible to determine the temperature of the catalytic converter 8 at a relatively low cost compared with a case using a sensor or the like for directly detecting the temperature.

Although in the above embodiment, the temperature of the catalytic converter 8 is estimated by the computer program, this is not limitative, but the temperature of the catalytic converter 8 may be detected directly by a sensor, such as a thermistor. Further, although in the embodiment, the target valve lift amount LCMD is calculated based on comparison using values of the amount of NOx estimated to remain uneliminated by the catalytic converter 8 (i.e. the uneliminated NOx estimate MNOx), this is not limitative, but the target valve lift amount LCMD may be calculated based on comparison using values of the amount of NOx (=FNOx·RNOx/100) estimated to be eliminated by the catalytic converter 8.

Furthermore, although in the embodiment, the target valve lift amount LCMD for use in feedback control of the EGR rate is used as a control parameter for controlling the EGR rate, this is not limitative, either, but any other suitable parameter for controlling the EGR rate may be employed.

It is further understood by those skilled in the art that the foregoing is a preferred embodiment of the invention, and that various changes and modifications may be made without departing from the spirit and scope thereof.

What is claimed is:

1. An engine control unit including a control program for causing a computer to carry out exhaust gas recirculation rate control for an internal combustion engine that eliminates NOx in exhaust gases by a catalyst, and recirculates the exhaust gases into an intake system, wherein the control program causes the computer to detect operating conditions of the engine, estimates NOx-eliminating performance of the catalyst, estimates uneliminated Nox, which is defined as an amount of NOx estimated to be emitted from the catalyst without being eliminated, and sets, an exhaust gas recirculation rate at which the exhaust gases are recirculated into the intake system such that the uneliminated NOx estimate calculated by said uneliminated NOx estimate-calculating means is minimized.

2. A engine control unit according to claim 1, wherein the control program causes the computer to calculate uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, the control program causes the computer to set the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, the control program causes the computer to set the exhaust gas recirculation rate to the value of the exhaust gas recirculation rate increased from the present value thereof by the predetermined value.

3. A engine control unit according to claim 1, wherein the control program causes the computer to estimate a temperature of the catalyst based on at least the detected operating conditions of the engine, and when causing the computer to estimate the NOx-eliminating performance of the catalyst, causes the computer to estimate the NOx-eliminating performance of the catalyst, according to the estimated temperature of the catalyst.

4. A engine control unit according to claim 3, wherein the control program causes the computer to calculate a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, the control program causes the computer to set the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, the control program causes the computer to set the exhaust gas recirculation rate to the value of the exhaust gas recirculation rate increased from the present value thereof by the predetermined value.

5. A engine control unit according to claim 4, wherein when causing the computer to estimate the NOx-eliminating performance of the catalyst, the control program causes the computer to calculate an estimated NOx elimination ratio to which NOx flowing into the catalyst is estimated to be reduced by the catalyst, according to the estimated temperature of the catalyst, and wherein when causing the computer to calculate the uneliminated NOx estimate, the control program causes the computer to calculate a NOx exhaust estimate which is defined as an amount of NOx estimated to be emitted from the engine and flow into the catalyst, based on the operating conditions of the engine and the exhaust gas recirculation rate, and calculate the uneliminated NOx estimate based on the calculated NOx exhaust estimate and the calculated estimated NOx elimination ratio.

6. An exhaust gas recirculation control system for an internal combustion engine that eliminates NOx in exhaust gases by a catalyst, and recirculates the exhaust gases into an intake system, the exhaust gas recirculation control system comprising:
   operating condition-detecting means for detecting operating conditions of the engine;
   catalyst performance-estimating means for estimating NOx-eliminating performance of the catalyst;
   uneliminated Nox estimate-calculating means for calculating, in response to the detected operating conditions of the engine and the estimated Nox-eliminating performance, an uneliminated NOx estimate which is defined as an amount of NOx estimated to be emitted from the catalyst without being eliminated thereby; and exhaust gas recirculation rate-setting means for setting, an exhaust gas recirculation rate at which the exhaust gases are recirculated into the intake system such that the uneliminated NOx estimate calculated by said uneliminated NOx estimate-calculating means is minimized.

7. An exhaust gas recirculation control system according to claim 6, wherein said uneliminated NOx estimate-calculating means calculates a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, said exhaust gas recirculation rate-setting means sets the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, said exhaust gas recirculation rate-setting means sets the exhaust gas recirculation rate to the value of the exhaust gas recirculation rate increased from the present value thereof by the predetermined value.

8. An exhaust gas recirculation control system according to claim 6, further comprising catalyst temperature-estimating means for estimating a temperature of the catalyst based on at least the detected operating conditions of the engine, and wherein said catalyst performance-estimating means estimates the NOx-eliminating performance of the catalyst, according to the estimated temperature of the catalyst.

9. An exhaust gas recirculation control system according to claim 8, wherein said uneliminated NOx estimate-calculating means calculates a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, said exhaust gas recirculation rate-setting means sets the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, said exhaust gas recirculation rate-setting means sets the exhaust gas recirculation rate to the value of the exhaust gas recirculation rate increased from the present value thereof by the predetermined value.

10. An exhaust gas recirculation control system according to claim 9, wherein said catalyst performance-estimating means includes estimated NOx elimination ratio-calculating means for calculating an estimated NOx elimination ratio to which NOx flowing into the catalyst is estimated to be reduced by the catalyst, according to the estimated temperature of the catalyst, and wherein said uneliminated NOx estimate-calculating means calculates a NOx exhaust estimate which is defined as an amount of NOx estimated to be emitted from the engine and flow into the catalyst, based on the operating conditions of the engine and the exhaust gas recirculation rate, and calculates the uneliminated NOx estimate based on the calculated NOx exhaust estimate and the calculated estimated NOx elimination ratio.

11. An exhaust gas recirculation control system for an internal combustion engine that eliminates NOx in exhaust gases by a catalyst, and recirculates the exhaust gases into an intake system, the exhaust gas recirculation control system comprising:

an operating condition-detecting module for detecting operating conditions of the engine;

a catalyst performance-estimating module for estimating NOx-eliminating performance of the catalyst;

uneliminated Nox estimate-calculating module for calculating, in response to the detected operating conditions of the engine and the estimated Nox-eliminating performance, an uneliminated NOx estimate which is defined as an amount of NOx estimated to be emitted from the catalyst without being eliminated thereby; and an exhaust gas recirculation rate-setting module for setting, an exhaust gas recirculation rate at which the exhaust gases are recirculated into the intake system such that the uneliminated NOx estimate calculated by said uneliminated NOx estimate-calculating means is minimized.

12. An exhaust gas recirculation control system according to claim 11, wherein said uneliminated NOx estimate-calculating module calculates a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, said exhaust gas recirculation rate-setting module sets the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, said exhaust gas recirculation rate-setting module sets the exhaust gas recirculation rate to the value of the exhaust gas recirculation rate increased from the present value thereof by the predetermined value.

13. An exhaust gas recirculation control system according to claim 11, further comprising a catalyst temperature-estimating module for estimating a temperature of the catalyst based on at least the detected operating conditions of the engine, and wherein said catalyst performance-estimating module estimates the NOx-eliminating performance of the catalyst, according to the estimated temperature of the catalyst.

14. An exhaust gas recirculation control system according to claim 13, wherein said uneliminated NOx estimate-calculating module calculates a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, said exhaust gas recirculation rate-setting module sets the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, said exhaust gas recirculation rate-setting module sets the exhaust gas recirculation rate to the value of the exhaust gas recirculation rate increased from the present value thereof by the predetermined value.

15. An exhaust gas recirculation control system according to claim 14, wherein said catalyst performance-estimating module includes an estimated NOx elimination ratio-calculating module for calculating an estimated NOx elimination ratio to which NOx flowing into the catalyst is estimated to be reduced by the catalyst, according to the estimated temperature of the catalyst, and wherein said uneliminated NOx estimate-calculating module calculates a NOx exhaust estimate which is defined as an amount of NOx estimated to be emitted from the engine and flow into the catalyst, based on the operating conditions of the engine and the exhaust gas recirculation rate, and calculates the uneliminated NOx estimate based on the calculated NOx exhaust estimate and the calculated estimated NOx elimination ratio.

16. A method of controlling an exhaust gas recirculation rate for an internal combustion engine that eliminates NOx in exhaust gases by a catalyst, and recirculates the exhaust gases into an intake system, the method comprising the steps of:
detecting operating conditions of the engine;
estimating NOx-eliminating performance of the catalyst;
estimating uneliminated Nox, which is defined as an amount of NOx estimated to be emitted from the catalyst without being eliminated, based on detected operating conditions of the engine and estimated Nox-eliminating performance of the catalyst; and
setting, an exhaust gas recirculation rate at which the exhaust gases are recirculated into the intake system such that the uneliminated NOx estimate calculated by said uneliminated NOx estimate-calculating means is minimized.

17. A method according to claim 16, wherein the step of calculating an uneliminated NOx estimate includes calculating a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, the step of setting an exhaust gas recirculation rate includes setting the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, the step of setting an exhaust gas recirculation rate includes setting the exhaust gas recirculation rate to the value of the exhaust gas recirculation rate increased from the present value thereof by the predetermined value.

18. A method according to claim 16, further comprising the step of estimating a temperature of the catalyst based on at least the detected operating conditions of the engine, and wherein the step of estimating NOx-eliminating performance of the catalyst includes estimating the NOx-eliminating performance of the catalyst, according to the estimated temperature of the catalyst.

19. A method according to claim 18, wherein the step of calculating an uneliminated NOx estimate includes calculating a present value of the uneliminated NOx estimate corresponding to a present value of the exhaust gas recirculation rate, a first predicted value of the uneliminated NOx estimate corresponding to a value of the exhaust gas recirculation rate increased from the present value thereof by a predetermined value, and a second predicted value of the uneliminated NOx estimate corresponding to a value of the exhaust gas recirculation rate decreased from the present value thereof by the predetermined value, and wherein when the present value of the uneliminated NOx estimate is larger than the second predicted value, the step of setting an exhaust gas recirculation rate includes setting the exhaust gas recirculation rate to the value of the exhaust gas recirculation rate decreased from the present value thereof by the predetermined value, and when the present value of the uneliminated NOx estimate is equal to or smaller than the second predicted value and at the same time larger than the first predicted value, the step of setting an exhaust gas recirculation rate includes setting the exhaust gas recirculation rate to the value of the exhaust gas recirculation rate increased from the present value thereof by the predetermined value.

20. A method according to claim 19, wherein the step of estimating NOx-eliminating performance of the catalyst includes the step of calculating an estimated NOx elimination ratio to which NOx flowing into the catalyst is estimated to be reduced by the catalyst, according to the estimated temperature of the catalyst, and wherein the step of calculating an uneliminated NOx estimate includes calculating a NOx exhaust estimate which is defined as an amount of NOx estimated to be emitted from the engine and flow into the catalyst, based on the operating conditions of the engine and the exhaust gas recirculation rate, and calculating the uneliminated NOx estimate based on the calculated NOx exhaust estimate and the calculated estimated NOx elimination ratio.

* * * * *